April 8, 1930. A. A. CLOKEY 1,753,331

CONSTANT SPEED DRIVE

Filed May 29, 1926

Inventor:
Allison A. Clokey.
by W. Griggs Att'y.

Patented Apr. 8, 1930

1,753,331

UNITED STATES PATENT OFFICE

ALLISON A. CLOKEY, OF RUTHERFORD, NEW JERSEY, ASSIGNOR TO BELL TELEPHONE LABORATORIES, INCORPORATED, OF NEW YORK, N. Y., A CORPORATION OF NEW YORK

CONSTANT-SPEED DRIVE

Application filed May 29, 1926. Serial No. 112,463.

This invention relates to constant speed drives, and has for an object to maintain constant the speed of the driving mechanism of printing telegraph and like apparatus.

A further object of this invention is to maintain constant both the speed and phase of a driving mechanism.

Distributors employed in printing telegraph systems, for example of the type described and claimed in Patent No. 1,689,328, granted to A. M. Curtis on October 30, 1928, are required to be kept in complete synchronism, that is, not only must they be driven at the same speed or frequency of rotation but they must be kept in the same phase relation. The invention is particularly applicable to distributors of the above type or other constant speed mechanism which are too heavy to be driven by an impulse motor of the La Cour type.

In accordance with the invention the speed of a printing telegraph distributor or the like is kept practically constant by using a main driving motor, the angular speed of which is nearly constant, and an auxiliary low power motor having a constant angular speed. The main motor may be a direct current motor which may be caused to rotate at the required number of revolutions per minute by connecting the armature through slip rings to a source of current of constant frequency. The direct current motor becomes then, in effect, a synchronous motor, but due to changes in the power supply or the like, it may not remain in constant phase relation to the constant frequency current with which it is synchronized.

It has been found, however, that if the main motor is adjusted to run at approximately the required speed it may be caused to rotate at substantially constant speed by mechanically connecting to it a low power motor such as an impulse motor of the La Cour type which is itself driven by a current of constant frequency. Preferably, the same constant frequency source is employed for driving the auxiliary motor and for establishing the rate of rotation of the main motor. With such an arrangement, both the speed and phase of the drive can be kept substantially constant.

Figure 1:
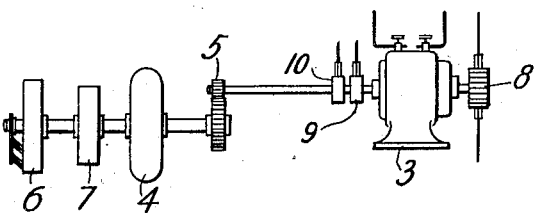
Figure 2:
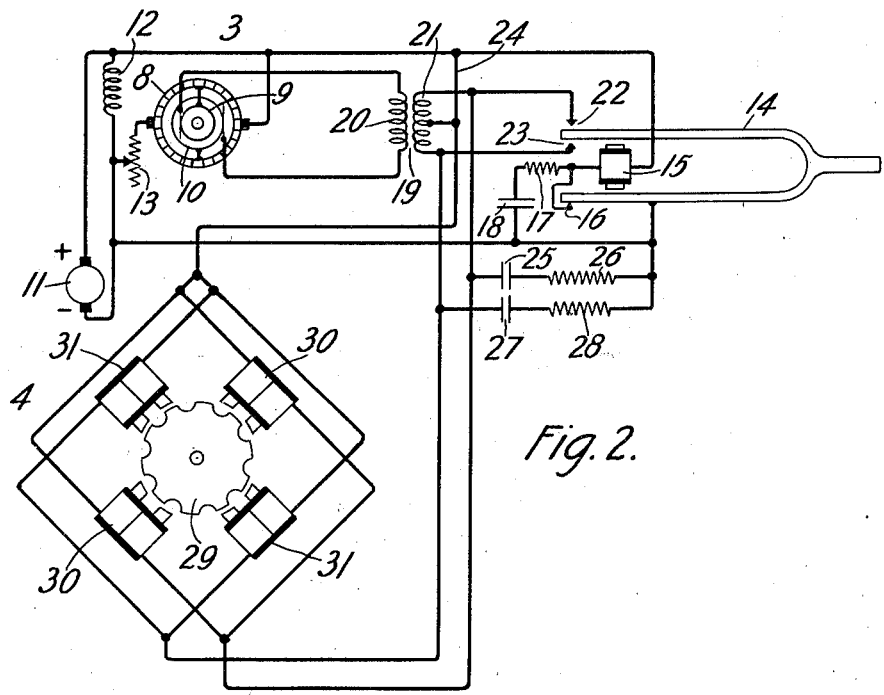

These and other objects and features of the invention can be more readily understood by reference to the following detailed description in connection with the drawing which shows one embodiment of the invention, Fig. 1 showing a plan view of the mechanical arrangement, and Fig. 2, a diagram of the electrical connections.

A telegraph distributor 6 is driven by means of a direct current motor 3 connected thereto through reduction gearing 5. Mounted on the same shaft as the distributor is a phonic wheel or La Cour motor 4 which co-operates with the direct current motor to maintain it at a constant speed. A mercury filled fly-wheel 7 is provided for steadying the speed of rotation to avoid sudden fluctuations in speed.

The motor 3 is equipped with a commutator 8 and slip rings 9 and 10 connected to diametrically opposite commutator bars. Power is supplied to the motor from a direct current source 11, the field winding 12 being connected in shunt to the armature. A resistance 13 is connected in series with the armature to control the speed.

A tuning fork generator 14 is employed for supplying constant frequency current to the alternating current winding of the motor 3. The fork is driven by a magnetic coil 15, one terminal of which is connected to the positive terminal of the source 11 and the other, through the vibrating contact 16, to the negative terminal of the source 11. A resistance 17 and a condenser 18 in series, are connected in shunt to the contact 16 to prevent sparking. A transformer 19 is provided having a secondary winding 20 connected to the motor slip rings 9 and 10 and a primary winding 21 connected to the output of the tuning fork generator to supply an alternating or pulsating current to the slip rings of the motor 3. The current is derived from the fork in a well known manner by the use of contacts 22 and 23, mounted on opposite sides of one tine of the work and connected to the terminals of the primary winding 21, and a connection 24 from the mid-point of the winding 21 to the positive terminal of the source 11. Condenser 25 in series with resistance 26, and condenser 27 in series with resistance 28 are connected in shunt to the contacts 22 and 23, respectively, to prevent sparking.

The phonic wheel 4, comprising stator windings 30—30 and 31—31 and magnetic rotor 29 is also connected to the tuning fork generator to receive current therefrom. The current is alternately supplied to the opposite pairs of stator coils in accordance with the vibrations of the fork in a well known manner, causing the wheel to operate as an impulse motor.

The system is first put into operation by starting both motors while the gears 5 are out of mesh and bringing the gears into mesh after the motors have been synchronized by adjusting the armature rheostat 13 until the motor 3 is brought into phase with the motor 4. After one adjustment both motors may be started together.

The driving system arranged in the manner above described has been found capable of maintaining constant both the speed and phase of the distributor 6 under widely varying conditions of power supply.

It is understood that the specific arrangement described represents only one embodiment of the invention and may be variously modified without departing from the spirit of the invention, as defined in the appended claims.

What is claimed is:

1. A constant speed drive comprising a direct current driving motor having an armature winding, slip rings and connections to said slip rings from points on said winding, a phonic wheel comprising a rotor mechanically connected to said motor, and a pair of stator windings, a transformer having primary and secondary windings, connections from the secondary winding of said transformer to said slip rings for applying alternating current to said armature to control the phase of said motor, a source of direct current, a tuning fork having a vibrating contactor and a pair of contacts arranged on opposite sides of said contactor for generating the alternating current, connections from one terminal of said source to said contactor, connections from the other terminal of said source to the mid-point of said primary winding, connections from said contacts to the other terminals of said primary winding and to one terminal of each of said stator windings, a connection from the other terminal of each of said stator windings to said other terminal of said source, said connection to the stator windings providing a path for the alternating current to operate the phonic wheel, and a flywheel cooperating with said rotor to thereby control the phase hunting operation of the motor.

2. A device to be driven at a constant speed with minimum hunting in combination with driving means comprising a driving machine mechanically coupled to the device, an impulse motor also coupled to the device, a source of current to establish the speed of said device, and connections whereby said source supplies current to said driving machine to control the speed thereof and to said impulse motor to drive it.

3. In combination in accordance with claim 2 characterized in this that the driving machine comprises a direct current motor having slip rings to which the source supplies current.

4. A combination in accordance with claim 2 characterized in this that the source is a fork having a circuit whereby it maintains itself continuously in operation, and pick-up circuits for supplying current to the driving machine and to the impulse motor.

In witness whereof, I hereunto subscribe my name this 27 day of May, A. D. 1926.

ALLISON A. CLOKEY.